(12) United States Patent
Fujiwara

(10) Patent No.: US 10,996,424 B2
(45) Date of Patent: May 4, 2021

(54) LENS BARREL AND IMAGING DEVICE

(71) Applicant: CANON KABUSHIKI KAISHA, Tokyo (JP)

(72) Inventor: Daisuke Fujiwara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 153 days.

(21) Appl. No.: 16/259,786

(22) Filed: Jan. 28, 2019

(65) Prior Publication Data

US 2019/0235199 A1 Aug. 1, 2019

(30) Foreign Application Priority Data

Jan. 31, 2018 (JP) .............................. JP2018-015117

(51) Int. Cl.
*G02B 7/02* (2021.01)
*G02B 7/04* (2021.01)

(52) U.S. Cl.
CPC ............... *G02B 7/04* (2013.01); *G02B 7/021* (2013.01)

(58) Field of Classification Search
CPC .......... G02B 7/102; G02B 7/08; G02B 7/021; G02B 7/04; G02B 7/10; G03B 17/12; G03B 2205/00

USPC ......................... 359/691, 696, 701, 704, 823
See application file for complete search history.

(56) References Cited

U.S. PATENT DOCUMENTS

| 8,320,064 B2 * | 11/2012 | Musha ................... | G02B 7/102 |
| | | | 359/823 |
| 2011/0122518 A1 | 5/2011 | Musha et al. | |
| 2019/0187404 A1* | 6/2019 | Onaka ................... | G03B 17/02 |

FOREIGN PATENT DOCUMENTS

| CN | 1172263 A | 2/1998 |
| CN | 1573399 A | 2/2005 |
| CN | 16011315 A | 3/2005 |
| CN | 101082692 A | 12/2007 |
| CN | 101636680 A | 1/2010 |
| JP | H06324252 A | 11/1994 |
| JP | 2013011918 A | 1/2013 |

* cited by examiner

*Primary Examiner* — Mahidere S Sahle
(74) *Attorney, Agent, or Firm* — Canon U.S.A., Inc. IP Division

(57) ABSTRACT

A lens barrel has a first lens-holding frame that holds a first lens group; a second lens-holding frame that holds a second lens group; and a lens-barrel casing. A first lens-driving unit drives the first lens-holding frame in the optical axis direction. A second lens-driving unit drives the second lens-holding frame in the optical axis direction. The first lens-driving unit is fixed to the fixing member. The second lens-driving unit is fixed to the first lens-holding frame.

8 Claims, 9 Drawing Sheets

LENS BARREL AND IMAGING DEVICE

BACKGROUND OF THE DISCLOSURE

Field of the Invention

The disclosure relates to a lens barrel and an imaging device; and in particular, to a lens barrel that holds lens groups so as to be movable forward and backward in an optical axis direction. The disclosure further relates to an imaging device having a lens barrel that holds lens groups so as to be movable forward and backward in an optical axis direction.

Description of the Related Art

Conventionally, there is an imaging device in which a camera unit used for capturing a subject is covered with a casing such as a dome and is rotatable about a pan axis and a tilt axis, and a subject can be captured by changing the orientation of the camera unit to a capturing direction desired by a user. In such an imaging device, there is a demand for high performance and reduction in size of the camera unit. When the performance of an image capturing lens is improved with increase in the zooming magnification or increase in size of an image pickup device for higher performance of the camera unit, however, this may result in an extended optical path of the image capturing lens. This may result in an increase in size of the entire imaging device including the camera unit and the casing covering the camera unit. Accordingly, for improvement of performance and reduction in size of the image capturing lens, there is an imaging device that performs zooming by linearly moving a plurality of lens groups in the optical axis direction by using a cam ring.

For example, in Japanese Patent Application Laid-Open No. H06-324252, a screw bar rotatable parallel to the optical axis is rotated, and a second group lens holding ring provided with a sleeve to be screwed by the screw bar is moved in the optical axis direction by a zoom motor. Thereby, a cam cylinder having a cam groove to be engaged with a cam follower of the second group lens holding ring is rotated, and a third group lens holding ring or an aperture holding ring is moved in the optical axis direction. Further, a fourth group lens holding ring is movable in the optical axis direction by engaging a screw shaft of a motor with a screw hole provided to a sleeve of the fourth group lens holding ring.

Japanese Patent Application Laid-Open No. 2013-11918 discloses that a first holder to which a first lens group-supporting frame is fixed and a second holder to which a second lens group-supporting frame is fixed are supported so as to be movable in the optical axis direction by rotation of a cam cylinder. Further, a third lens group supporting frame used for supporting a third lens group that performs focusing is supported so as to be movable relatively to the second holder.

In the conventional technology disclosed in Japanese Patent Application Laid-Open No. H06-324252, however, when the fourth group lens holding ring moves forward and backward in the optical axis direction to perform focusing, the focusing cannot respond to the zooming speed, and thereby the lens may be out of focus during zooming.

Further, in the conventional technology disclosed in Japanese Patent Application Laid-Open No. 2013-11918 described above, the lens is less likely to be out of focus during zooming. Since the weight of the second holder increases, however, a motor torque may be insufficient resulting in difficulty in zooming when the zooming is performed by a motor instead of a manual operation.

SUMMARY OF THE DISCLOSURE

To achieve the objective described above, a lens barrel is provided having a first lens-holding frame that holds a first lens group; a second lens-holding frame holds a second lens group; and a lens-barrel casing. A first lens-driving unit drives the first lens-holding frame in the optical axis direction. A second lens-driving unit drives the second lens-holding frame in the optical axis direction. The first lens-driving unit is fixed to the fixing member, and the second lens-driving unit is fixed to the first lens-holding frame.

Further features and aspects of the disclosure will become apparent from the following description of example embodiments with reference to the attached drawings.

DESCRIPTION OF THE EMBODIMENTS

Various embodiments, aspects, examples and features of the disclosure will now be described in detail in accordance with the accompanying drawings.

Figure 1:
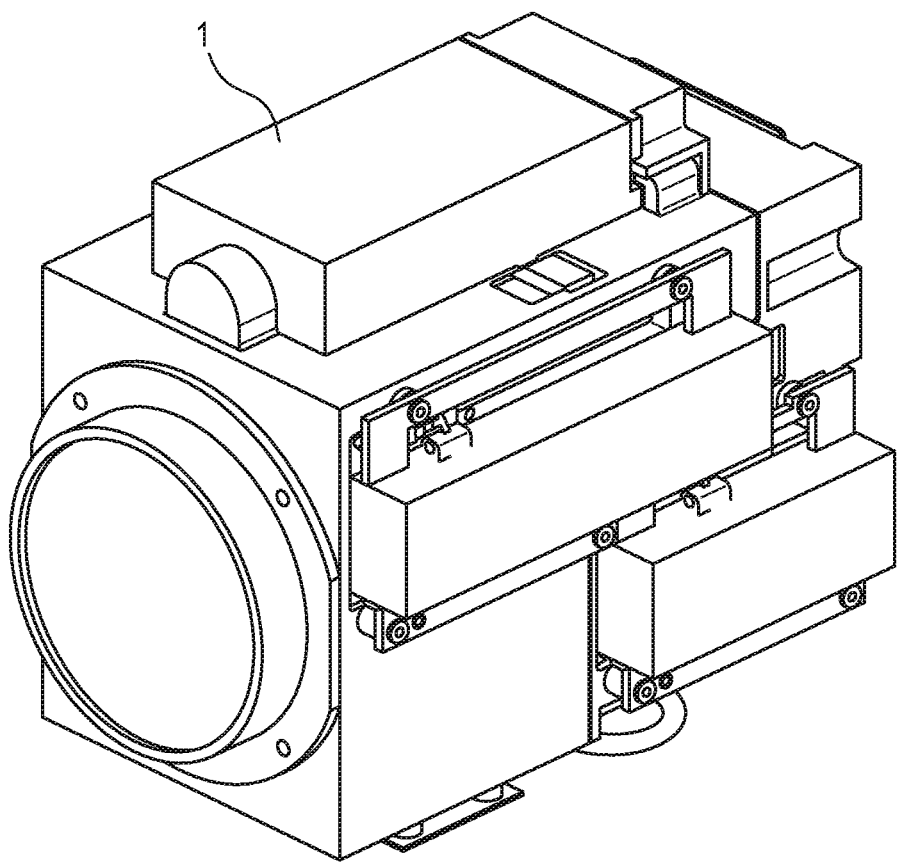
FIG. 1 is a perspective view of an example lens barrel of the disclosure.
Figure 2:
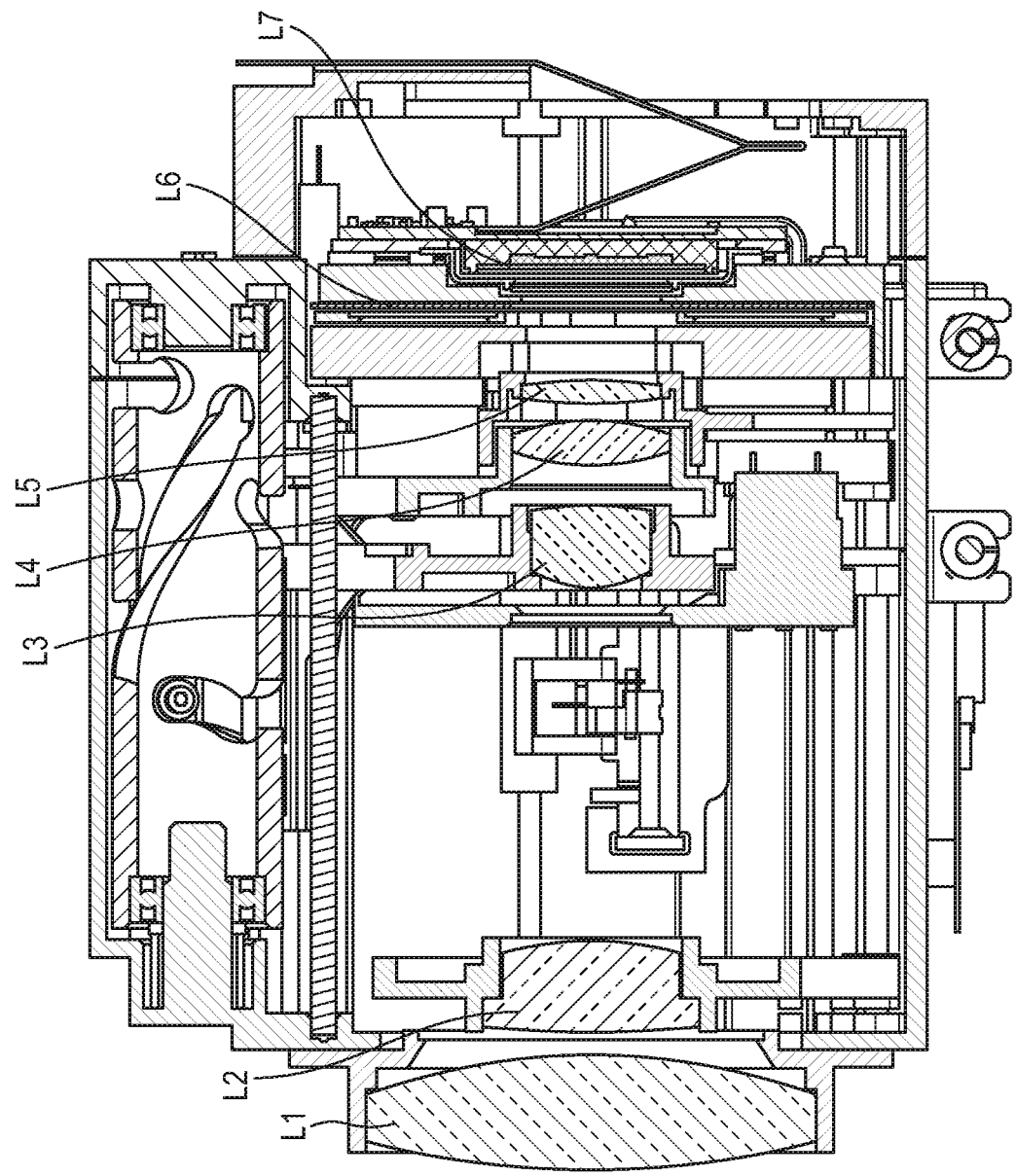
FIG. 2 is a sectional view of the example lens barrel of the disclosure.
Figure 3:
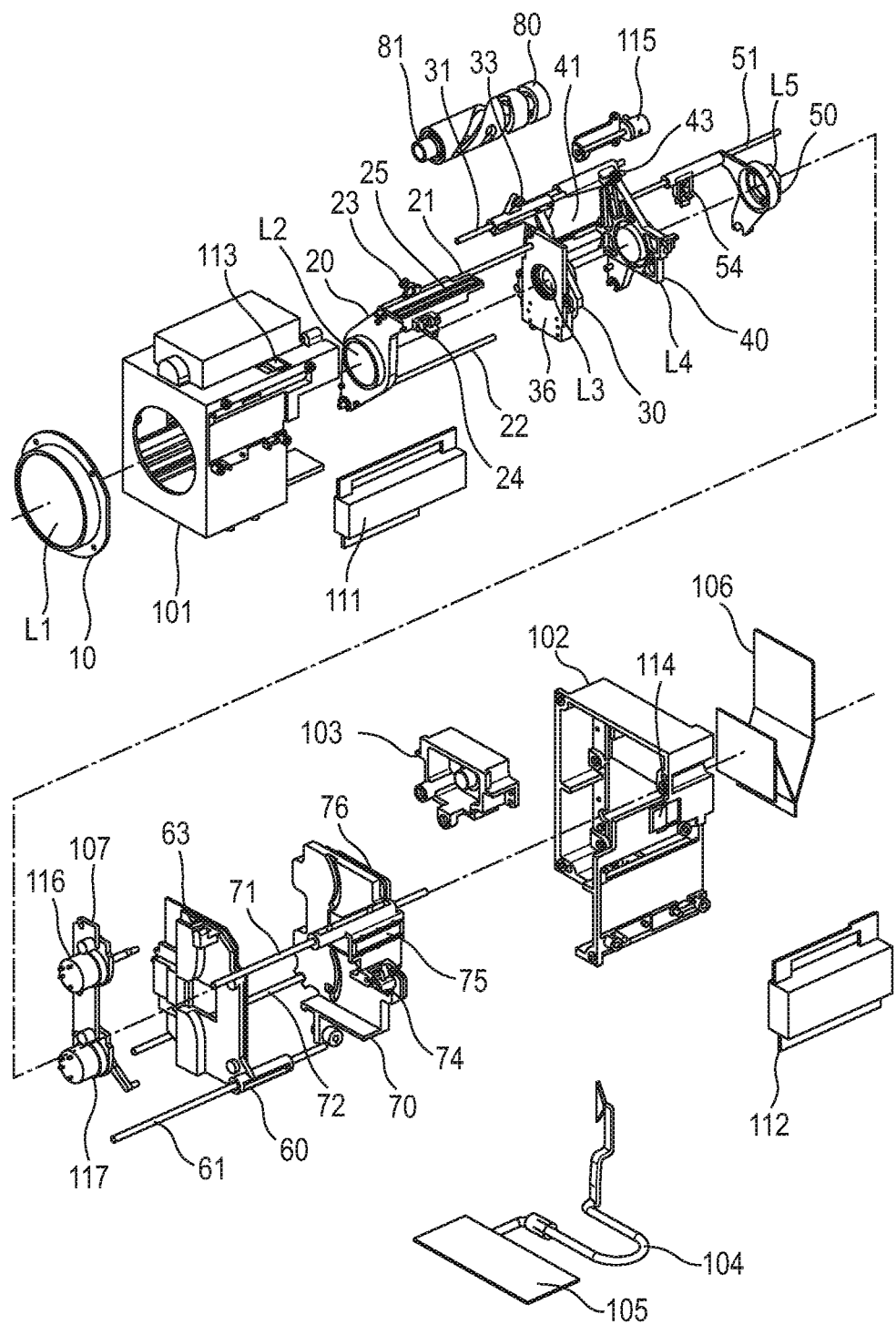
FIG. 3 is a perspective exploded view of the example lens barrel of the disclosure.

FIG. 1 illustrates a lens barrel 1, FIG. 2 is a sectional view of the lens barrel 1, and FIG. 3 is a perspective exploded view of the lens barrel 1.

The lens barrel 1 has a first group lens L1, a second group lens L2, a third group lens L3, a fourth group lens L4, and a fifth group lens L5 in this order from a subject side. The first group lens L1 is fixed in an optical axis direction. The second group lens L2, the third group lens L3, and the fourth group lens L4 are zoom lenses that move in the optical axis direction to perform a zooming operation (zooming). The fifth group lens L5 is a focus lens that moves in the optical axis direction to perform a focusing operation (focusing). Reference L6 denotes an optical filter such as an IR cut filter or a band-pass filter, for example, which moves in the direction orthogonal to the optical axis, is inserted into and removed from the optical path, and transmits or blocks a light beam in a specific wavelength range. Reference L7 is an image pickup device, which is a photoelectric conversion element such as a CCD sensor, a CMOS sensor, or the like.

Note that a first lens group in the claims corresponds to the fourth group lens L4 in the embodiment, and a first lens-holding frame in the claims corresponds to a fourth group lens-barrel in the embodiment. Further, a second lens group in the claims corresponds to the fifth group lens L5 in the embodiment, and a second lens-holding frame in the claims corresponds to a fifth group lens-barrel in the embodiment.

Reference 10 is a first group lens-barrel that holds the first group lens L1. Reference 20 is a second group lens-barrel that holds the second group lens L2. References 21 and 22 denote guide bars, and a sleeve portion provided in the second group lens-barrel 20 is engaged with the guide bar 21 to guide the second group lens-barrel 20 in the optical axis direction. Further, a U-groove provided in the second group lens-barrel 20 is engaged with the guide bar 22 to restrict a rotation about the guide bar 21 of the second group lens-barrel 20. Reference 23 denotes a cam follower, which is attached to the second group lens-barrel 20 so as to be rotatable. Reference 24 denotes a rack member, which is attached to the second group lens-barrel 20 so as to be rotatable within a plane perpendicular to the optical axis. Reference 25 denotes a position detection scale, which is fixed to the second group lens-barrel 20.

Reference 30 is a third group lens-barrel that holds the third group lens L3. Reference 31 denotes a guide bar, and a sleeve portion provided in the third group lens-barrel 30 is engaged with the guide bar 31 to guide the third group lens-barrel 30 to the optical axis direction. Further, a U-groove provided in the third group lens-barrel 30 is engaged with the guide bar 22 to restrict a rotation about the guide bar 31 of the third group lens-barrel 30. Reference 33 denotes a cam follower, which is attached to the third group lens-barrel 30 so as to be rotatable. Reference 36 denotes an aperture unit that changes an aperture diameter by driving an aperture blade and is fixed to the third group lens-barrel 30.

Reference 40 is a fourth group lens-barrel that holds the fourth group lens L4. Reference 41 is a guide bar as a first guide member and supports the first lens-holding frame so as to be movable forward and backward in the optical axis direction. The guide bar 41 is engaged with a sleeve portion provided in the fourth group lens-barrel 40 to guide the fourth group lens-barrel 40 in the optical axis direction. Further, a U-groove provided in the fourth group lens-barrel 40 is engaged with the guide bar 22 to restrict a rotation about the guide bar 41 of the fourth group lens-barrel 40. Reference 43 denotes a cam follower, which is attached to the fourth group lens-barrel 40 so as to be rotatable.

Reference 50 is a fifth group lens-barrel that holds the fifth group lens L5. Reference 51 is a guide bar as a second guide member and supports a second lens-holding frame so as to be movable forward and backward in the optical axis direction. The guide bar 51 is engaged with a sleeve portion provided in the fifth group lens-barrel 50 to guide the fifth group lens-barrel 50 in the optical axis direction. Further, a U-groove provided in the fifth group lens-barrel 50 is engaged with the guide bar 22 to restrict a rotation about the guide bar 51 of the fifth group lens-barrel 50. Reference 54 denotes a rack member, which is attached to the fifth group lens-barrel 50 so as to be rotatable within a plane perpendicular to the optical axis direction.

Reference 60 is an optical filter-holding frame that holds the optical filter L6. Reference 61 denotes a guide bar, and a sleeve portion provided in the optical filter-holding frame 60 is engaged with the guide bar 61 to guide the optical filter-holding frame 60 in the optical axis direction. Further, a U-groove provided in the optical filter-holding frame 60 is engaged with the guide bar 51 to restrict rotation around the guide bar 61 of the optical filter-holding frame 60. Reference 63 denotes a cam follower, which is attached to the optical filter-holding frame 60 so as to be rotatable.

Reference 70 is an image pickup device-holding frame that holds the image pickup device L7. Reference 76 denotes a sensor substrate to which the image pickup device L7 (not illustrated) is fixed, which is attached to the image pickup device-holding frame 70. References 71 and 72 denote guide bars, and a sleeve portion provided in the image pickup device-holding frame 70 is engaged with the guide bar 71 to guide the image pickup device-holding frame 70 in the optical axis direction. Further, a U-groove provided in the image pickup device-holding frame 70 is engaged with the guide bar 72 to restrict rotation about the guide bar 71 of the image pickup device-holding frame 70. Reference 74 denotes a rack member, which is attached to the image pickup device-holding frame 70 so as to be rotatable within a plane perpendicular to the optical axis. Reference 75 denotes a position detection scale, which is fixed to the image pickup device-holding frame 70.

Figure 4:
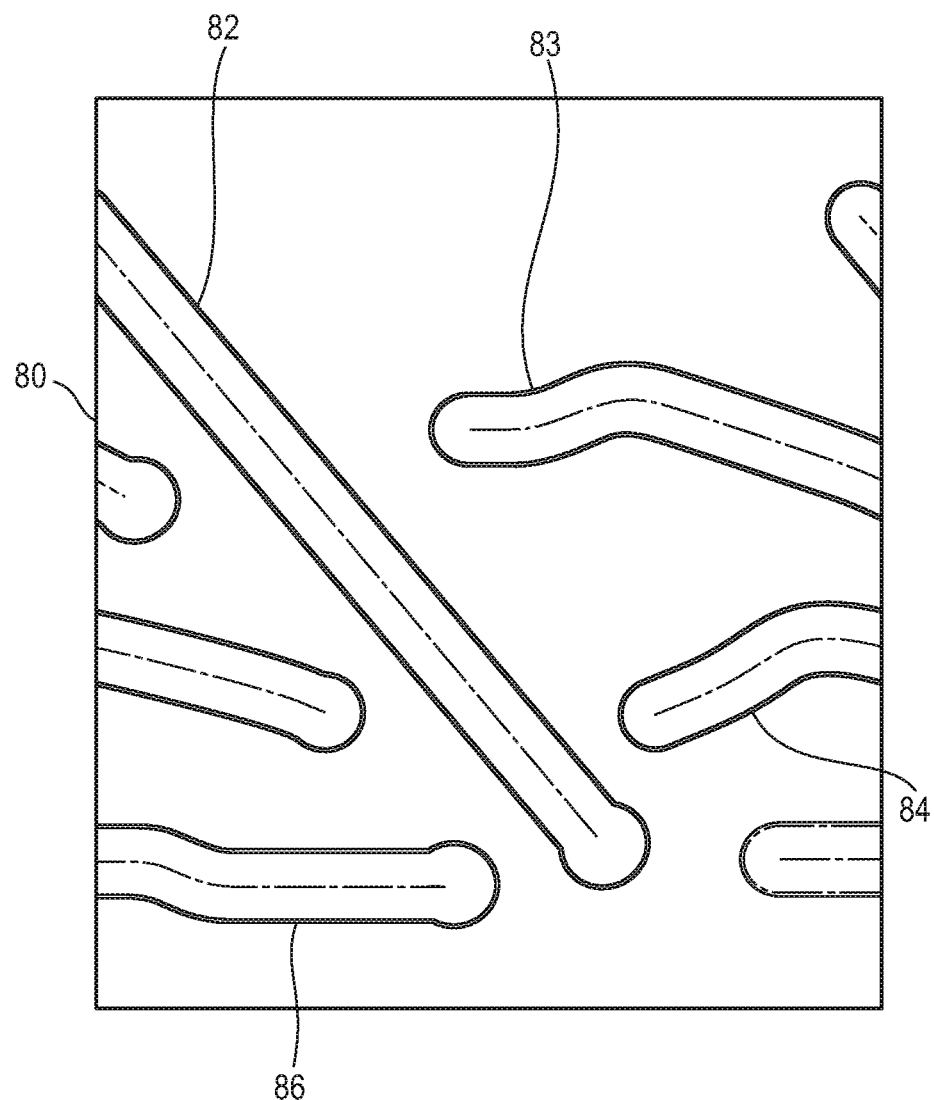
FIG. 4 is an expansion view illustrating an example cam groove of an example cam cylinder illustrated in FIG. 3.

Reference 80 denotes a cam cylinder. FIG. 4 is an expansion view illustrating cam grooves of the cam cylinder 80. Reference 82 denotes a second group cam groove, which is engaged with the cam follower 23 of the second group lens-barrel 20. Reference 83 denotes a third group cam groove, which is engaged with the cam follower 33 of the third group lens-barrel 30. Reference 84 denotes a fourth group cam groove, which is engaged with the cam follower 43 of the fourth group lens-barrel 40. Reference 86 denotes an optical filter cam groove, which is engaged with the cam follower 63 of the optical filter-holding frame 60.

Reference 101 denotes a fixed lens-barrel as a lens-barrel casing, reference 102 denotes a rear lens-barrel, reference 103 denotes a guide bar-holding member, and reference 107 denotes an optical filter insertion-removal motor-holding member. The first group lens-barrel 10, the guide bar-holding member 103, and the optical filter insertion-removal motor-holding member 107 are fixed to the fixed lens-barrel 101.

The guide bars 21, 22, 51, 61, 71, and 72 are held between the fixed lens-barrel 101 and the rear lens-barrel 102. The guide bar 31 and 41 are held between the fixed lens-barrel 101 and the guide bar-holding member 103. Reference 81 denotes a cam cylinder actuation member, which actuates the cam cylinder 80 in the optical axis direction. The cam cylinder 80 is held between the fixed lens-barrel 101 and the rear lens-barrel 102 via the cam cylinder actuation member 81 so as to be rotatable.

References 113 and 114 denote optical sensors, the optical sensor 113 is fixed to the fixed lens-barrel 101, and the optical sensor 114 is fixed to the rear lens-barrel 102. Each of the optical sensors 113 and 114 has a light emitting portion and a light receiving portion. The optical sensors 113 and 114 detect a light having a periodic bright and dark pattern reflected by position detection scales 25 and 75 attached to the second group lens-barrel 20 and the image pickup device-holding frame 70, respectively, and convert the light into an electrical signal. The optical sensors 113 and 114 then detect the positions of the second group lens-barrel 20 and the image pickup device-holding frame 70.

References 111 and 112 denote oscillatory linear actuators. Each of the oscillatory linear actuators 111 and 112 is formed of a slider and a vibrator (not illustrated). Each of the oscillatory linear actuators 111 and 112 is an actuator in which approximately elliptical motion occurs in the vibrator when a frequency signal is input to the vibrator via a flexible printed board (not illustrated), and this can generate drive force on a pressure contact surface against the slider.

The oscillatory linear actuator 111 as a first lens-driving unit is fixed to the fixed lens-barrel 101 and engaged with the rack member 24. When drive force in the optical axis direction occurs in the oscillatory linear actuator 111, the second group lens-barrel 20 moves forward and backward in the optical axis direction via the rack member 24. When the second group lens-barrel 20 moves forward and backward in the optical axis direction, the cam cylinder 80 engaged with the cam follower 23 of the second group lens-barrel 20 rotates within a plane perpendicular to the optical axis. When the cam cylinder 80 rotates within the plane perpendicular to the optical axis, the third group lens-barrel 30, the fourth group lens-barrel 40, and the optical filter-holding frame 60 move forward and backward in the optical axis direction via the cam follower 33, 43, and 63 engaged with the cam cylinder 80.

The oscillatory linear actuator 112 is fixed to the rear lens-barrel 102 and is engaged with the rack member 74. When drive force in the optical axis direction occurs in the oscillatory linear actuator 112, the image pickup device-holding frame 70 moves forward and backward in the optical axis direction via the rack member 74.

That is, driving the oscillatory linear actuators 111 and 112 causes the second group lens-barrel 20, the third group lens-barrel 30, the fourth group lens-barrel 40, the optical filter-holding frame 60, and the image pickup device-holding frame 70 to move forward and backward in the optical axis direction, and a zooming operation can be performed.

Reference 115 denotes a stepping motor as a second lens-driving unit. The stepping motor 115 is fixed to the fourth group lens-barrel 40 and engaged with the rack member 54 attached to the fifth group lens-barrel 50. When drive force in the optical axis direction is generated in the stepping motor 115, the fifth group lens-barrel 50 moves forward and backward in the optical axis direction via the rack member 54, and the focusing operation can be performed.

Figure 5:
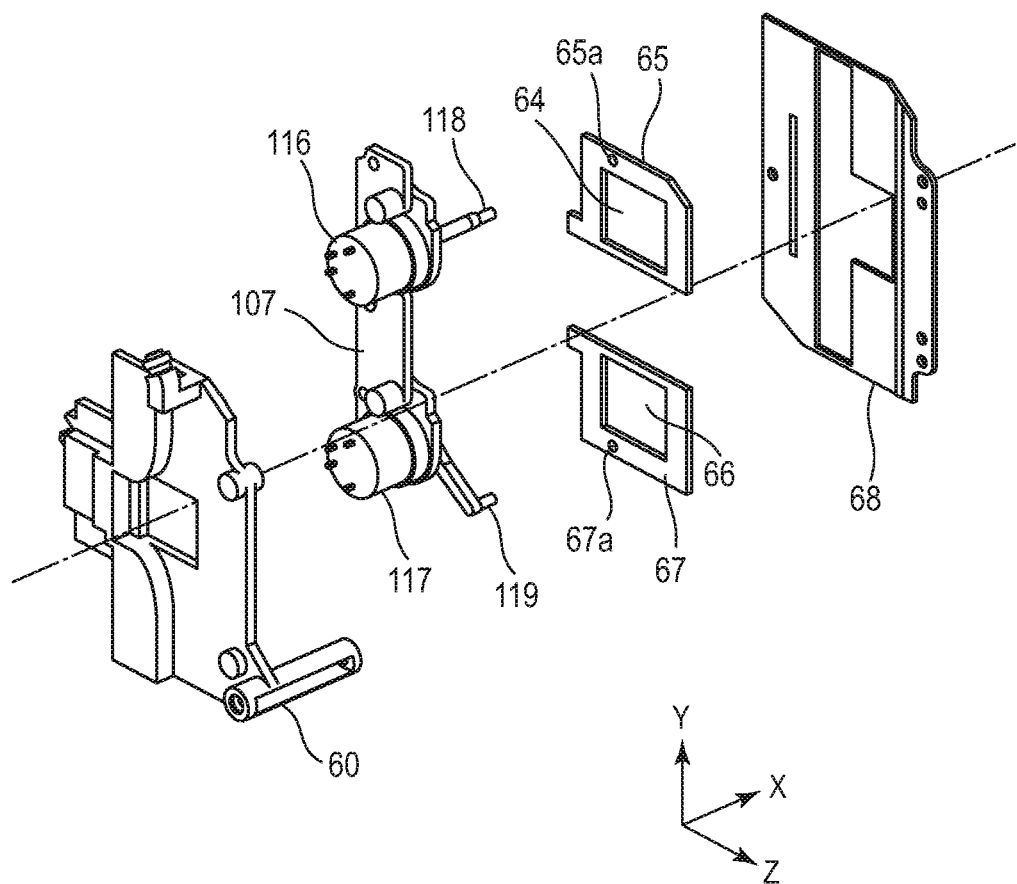
FIG. 5 is a perspective exploded view illustrating example detail of an optical filter drive mechanism illustrated in FIG. 3.

References 116 and 117 denote optical filter insertion-removal motors. The optical filter insertion-removal motors 116 and 117 are fixed to an optical filter insertion-removal motor-holding member 107. FIG. 5 is a perspective exploded view illustrating the detail of the optical filter driving mechanism. Reference 64 denotes an IR cut filter, which has optical characteristics to cut infrared rays. Reference 65 denotes a filter-holding frame that holds the IR cut filter 64. Reference 66 denotes a band-pass filter, which has optical characteristics of transmitting a light beam of a specific wavelength range. Reference 67 is a filter-holding frame that holds the band-pass filter 66. Reference 68 denotes a cover member, which holds, together with the optical filter-holding frame 60, the filter-holding frames 65 and 67 so as to be movable within a plane perpendicular to the optical axis. References 118 and 119 denote engagement arms, which are coupled to the optical filter insertion-removal motors 116 and 117, respectively. The engagement arms 118 and 119 are engaged with engagement holes 65a and 67a provided to the filter-holding frames 65 and 67. When the optical filter insertion-removal motors 116 and 117 rotate about axes parallel to the optical axis, the engagement arms 118 and 119 rotate, and the filter-holding frames 65 and 67 move in the Y-direction in FIG. 5.

When the filter-holding frame 65 is inserted into the optical path, infrared light is cut from the light that enters the image pickup device, and thereby a light beam suitable for generating a normal color image can be obtained. When the filter-holding frame 67 is inserted into the optical path, only a light beam of a specific wavelength range such as a near-infrared light enters the image pickup device, for example, and thereby a light beam suitable for generating an image having a higher contrast is obtained. When the filter-holding frames 65 and 67 are removed from the optical path, a light beam including infrared light enters the image pickup device, and thereby a greater amount of light can be obtained such that an image can be captured even under low luminance such as nighttime.

Reference 104 denotes an electric cable, which inputs and outputs an electrical signal to and from the image pickup device L7. Reference 105 denotes a lens substrate, which is fixed to the fixed lens-barrel 101. The lens substrate 105 inputs and outputs an electrical signal to and from each actuator such as the oscillatory linear actuator 111 or 112, the stepping motor 115, the optical filter insertion-removal motor 116 or 117, or the like via a flexible printed board (not illustrated). Further, the lens substrate 105 inputs and outputs an electrical signal to and from each sensor such as the optical sensor 113 or 114 via a flexible printed board (not illustrated).

The electric cable 104 has one end connected to the sensor substrate 76 and the other end connected to the lens substrate 105. The electric cable 104 is bent in a U-shape and both ends thereof are fixed, and the U-shape is formed with a curvature such that thrust of the oscillatory linear actuator 112 required for moving the image pickup device-holding frame 70 does not excessively increase even when the image pickup device-holding frame 70 moves in the optical axis direction.

Reference 106 denotes a heat conduction member. The heat conduction member 106 is formed of a flexible sheet member having a high thermal conductivity such as a graphite sheet. One end of the heat conduction member 106 is fixed to the sensor substrate 76, and the other end is fixed to a heatsink (not illustrated). Heat generated in the sensor substrate 76 is then transferred to the heatsink, and thereby a rise in the temperature of the image pickup device L7 is suppressed.

The heat conduction member 106 is folded in a bellows shape parallel to the optical axis of the image pickup device-holding frame 70 in the backside such that thrust of the oscillatory linear actuator 112 required to move the image pickup device-holding frame 70 does not excessively increase even when the image pickup device-holding frame 70 moves in the optical axis direction.

Figure 6:
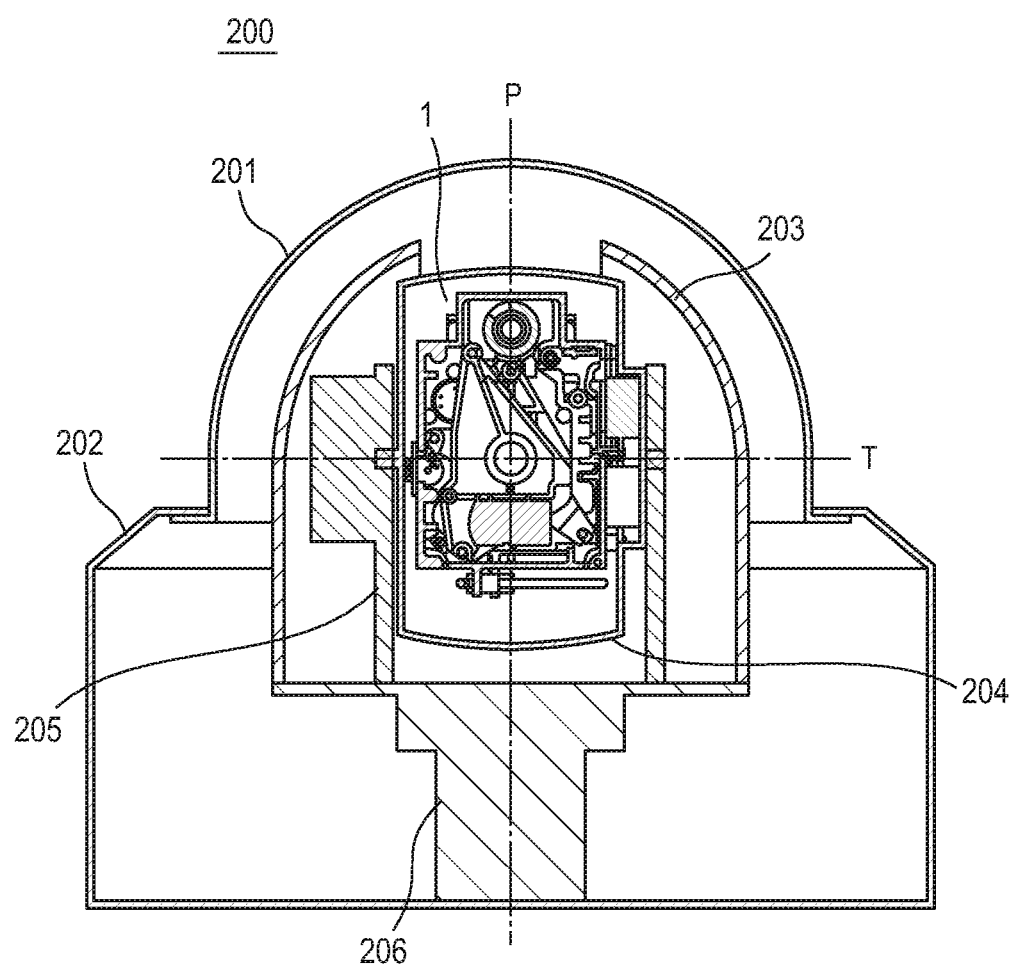
FIG. 6 is a sectional view taken along a plane perpendicular to an optical axis of an example surveillance camera in which the imaging device of the disclosure is incorporated.

FIG. 6 is a sectional view taken along a plane perpendicular to the optical axis of a surveillance camera 200, which is an example of an imaging device in which the lens barrel 1 rotatable about a pan axis and a tilt axis is covered with a casing such as a hemispherical dome cover or the like. Reference 201 denotes a dome cover, which is a cover member made of a transparent or translucent plastic. Reference 202 denotes a case, and reference 203 denotes an inner cover. Reference 204 denotes a camera case, which holds the imaging device 1 therein. Reference 205 denotes a tilt unit, which supports the camera case 204 so as to be rotatable about a tilt axis T. The tilt unit 205 has a tilt drive unit formed of a stepping motor or the like (not illustrated) and electrically drives the camera unit 204 in a tilt direction. Reference 206 denotes a pan unit, which supports the tilt unit 205 so as to be rotatable about a pan axis P. The pan unit 206 has a pan drive unit formed of a stepping motor or the like (not illustrated) and electrically drives the tilt unit 205 in a pan direction.

Figure 7:
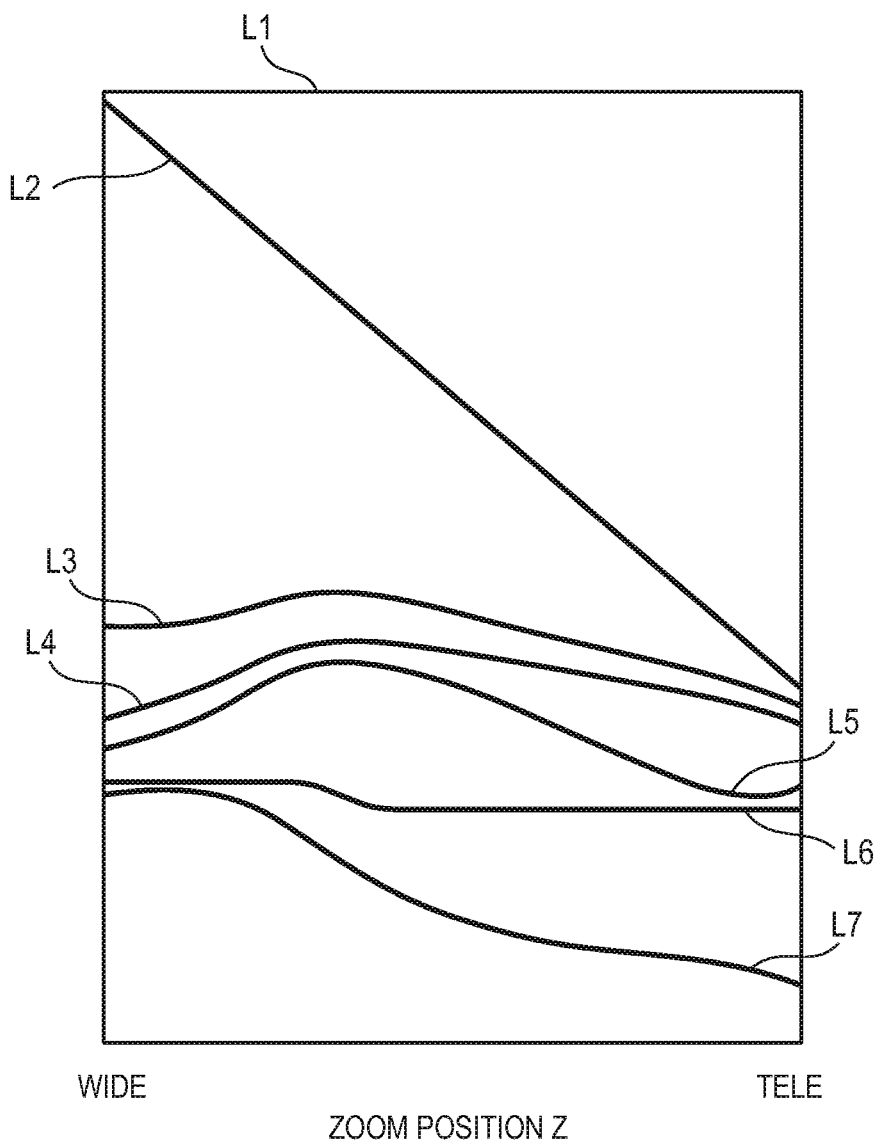
FIG. 7 is a diagram illustrating a motion track of each group of an example imaging device of the disclosure.
Figure 8A:
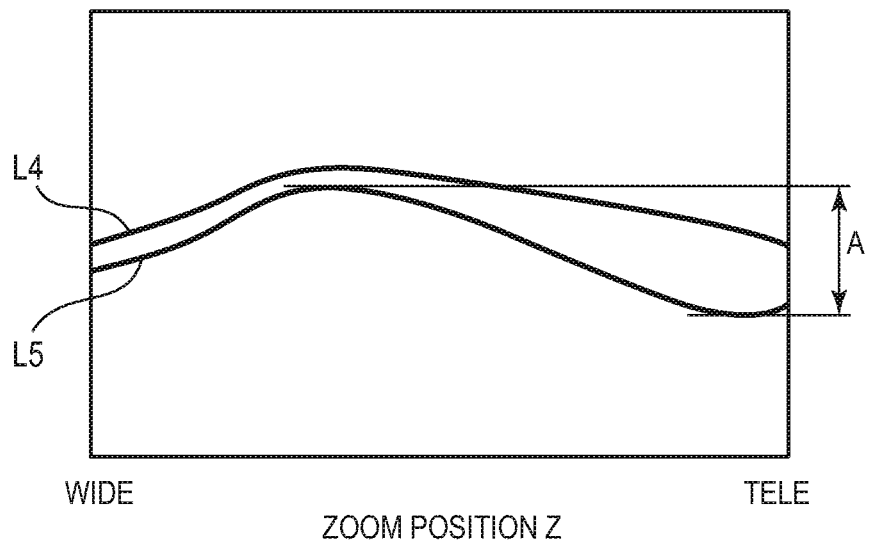
FIG. 8A is a diagram illustrating motion tracks of a fourth group lens and a fifth group lens of the example imaging device of the disclosure.
Figure 8B:
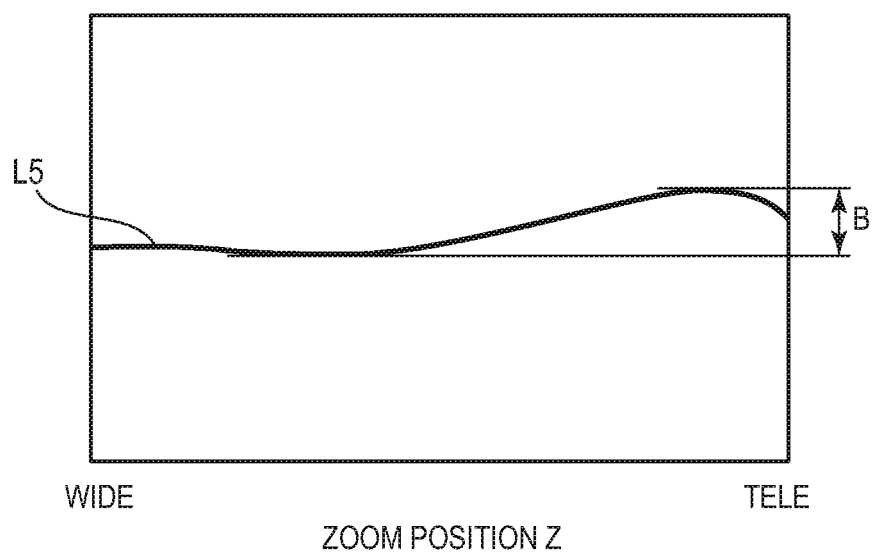
FIG. 8B is a diagram illustrating the motion track of the fifth group lens of the example imaging device of the disclosure.

FIG. 7 is a diagram illustrating motion tracks of respective groups that form the lens barrel 1. References L to L7 in FIG. 7 denote the motion tracks of the first group lens L1 to the fifth group lens L5, the optical filter L6, and the image pickup device L7. FIG. 8A illustrates the motion tracks of the fourth group lens L4 and the fifth group lens L5, and FIG. 8B illustrates a track of the relative position of the fifth group lens L5 to the fourth group lens L4. Reference A in FIG. 8A denotes a stroke required for the fifth group lens L5 between WIDE and TELE in the optical axis direction. Reference B in FIG. 8B denotes a stroke required for driving the fifth group lens L5 between WIDE and TELE when the stepping motor 115 is mounted on the fourth group lens-barrel 40.

In the present embodiment, the stroke B is approximately half the stroke A. The stepping motor 115 is mounted on the fourth group lens-barrel 40 that holds the fourth group lens L4 whose motion track has a close shape to the motion track of the fifth group lens L5, and thereby the difference of the motion tracks between the fifth group lens-barrel 50 and the fourth group lens-barrel 40 can be driven by the stepping motor 115. Thereby, the stroke required for driving the fifth group lens L5 can be reduced. When the stroke of the fifth group lens L5 can be reduced, a focus lens group can respond to the zooming speed without delay, and thereby a zooming operation can be performed without occurrence of a blur.

Further, only the stepping motor 115 is mounted on the fourth group lens-barrel 40, and the guide bars 51 and 22 that hold the fifth group lens-barrel 50 and a structure that holds the guide bars are provided to the fixed lens-barrel 101 and the rear lens-barrel 102, and thereby an increase in mass of the fourth group lens-barrel 40 can be suppressed. As a result, an increase in thrust of a driving unit required for zooming can be suppressed and an increase in cost and size of the driving unit can be suppressed.

Note that, although the stepping motor 115 that drives the fifth group lens-barrel 50 is mounted on the adjacent fourth group lens-barrel 40 in the present embodiment, a lens barrel in which the stepping motor is mounted is not required to be adjacent as long as a required stroke of the focus lens group can be reduced.

Figure 9:
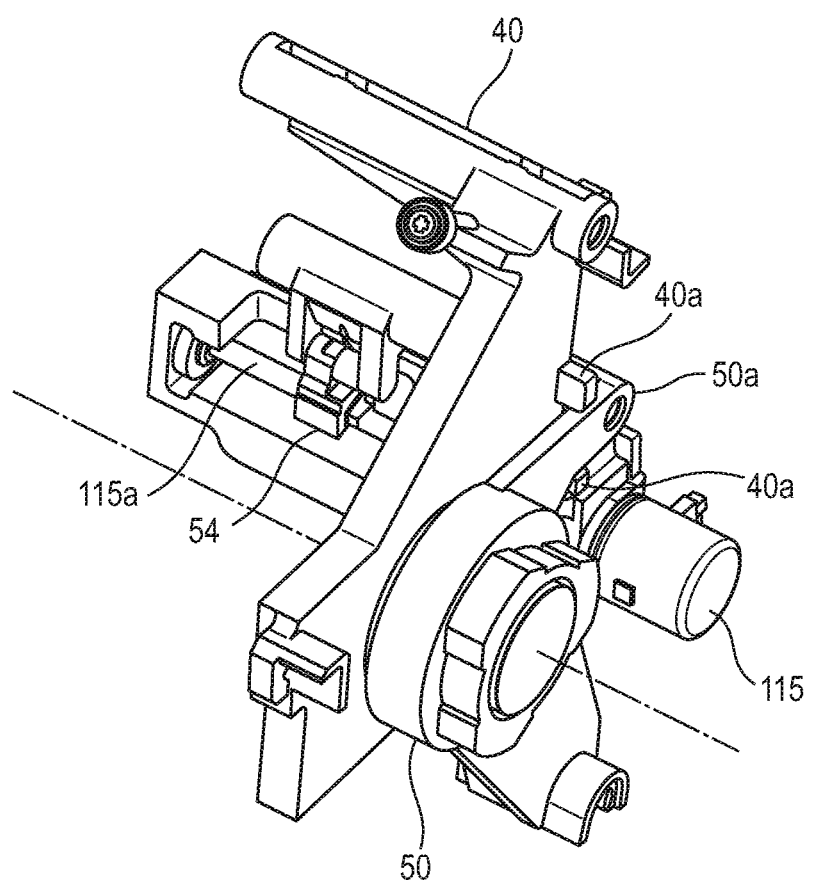
FIG. 9 is a perspective view of a fourth group lens-barrel and a fifth group lens-barrel of the example imaging device of the disclosure.

FIG. 9 is a perspective view of the fourth group lens-barrel 40 and the fifth group lens-barrel 50. Reference numeral 40a denotes an engagement portion with the fifth group lens-barrel 50 provided in the fourth group lens-barrel 40, and reference 50a denotes an engagement portion with the fourth group lens-barrel 40 provided in the fifth group lens-barrel 50. The fourth group lens-barrel 40 and the fifth group lens-barrel 50 are actuated to each other around axes parallel to the optical axis by a rack 54 that is actuated by a spring as a rack actuation member and is engaged around the rotation axis of a lead screw 115a of the stepping motor 115. Furthermore, when the engagement portion 40a and the engagement portion 50a are engaged with each other, the fourth group lens-barrel 40 and the fifth group lens-barrel 50 can be handled as a single unit. When the lens barrel 1 is assembled, the fourth group lens-barrel 40 and the fifth group lens-barrel 50 are incorporated in the fixed lens-barrel 101, the guide bars 22, 41, and 51 are assembled, and thereby the engagement of the engagement portion 40a and the engagement portion 50a are separated from each other. Further, since the fourth group lens-barrel 40 and the fifth group lens-barrel 50 can be relatively moved in the optical axis direction, this allows for easier assembly.

As described above, the performance of the image capturing lens can be improved without increase in the size of the casing such as a dome, and an imaging device capable of zooming while maintaining focusing can be provided.

While the disclosure has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2018-015117, filed Jan. 31, 2018, which is hereby incorporated by reference herein in its entirety.

What is claimed is:

1. A lens barrel comprising:
   a cam cylinder having a cam groove;
   a first lens-holding frame that holds a first lens group and having a cam follower engaged with the cam groove;
   a second lens-holding frame that holds a second lens group;
   a casing that accommodates the first lens-holding frame and the second lens-holding frame;
   a first lens-driving unit that drives the first lens-holding frame in an optical axis direction by rotating the cam cylinder about an axis parallel to the optical axis; and
   a second lens-driving unit that drives the second lens-holding frame in the optical axis direction,
   wherein the first lens-driving unit is fixed to the casing, and the second lens-driving unit is fixed to the first lens-holding frame.

2. The lens barrel according to claim 1, wherein the first lens-driving unit that rotates the cam cylinder is an oscillatory linear actuator.

3. The lens barrel according to claim 1,
   wherein the second lens-holding frame has a rack,
   wherein the second lens-driving unit is a stepping motor and is engaged with the rack of the second lens-holding frame.

4. The lens barrel according to claim 1, wherein the first lens-holding frame and the second lens-holding frame hold lens groups that are adjacent to each other.

5. The lens barrel according to claim 1,
   wherein the first lens group is a zoom lens, and
   wherein the second lens group is a focus lens.

6. The lens barrel according to claim 1 further comprising:
   a first guide bar that is supported by the casing and supports the first lens-holding frame so as to be movable in the optical axis direction; and
   a second guide bar that is supported by the casing and supports the second lens-holding frame so as to be movable in the optical axis direction.

7. An imaging device comprising:
   the lens barrel according to claim 1; and
   a dome cover that covers the lens barrel and is formed in a hemispherical-shape.

8. The lens barrel according to claim 6,
   wherein the first lens-holding frame is integrated with the second lens-holding frame by engagement between the first lens-holding frame and the second lens-holding frame when the first lens-holding frame and the second lens-holding frame are assembled to the casing, and wherein engagement between the first lens-holding frame and the second lens-holding frame is released when the first and second guide bars are fixed to the casing.

\* \* \* \* \*